United States Patent
Tomiyasu

[15] 3,665,335
[45] May 23, 1972

[54] COOLABLE SLAB LASER

[72] Inventor: Kiyo Tomiyasu, Paoli, Pa.
[73] Assignee: General Electric Company
[22] Filed: Jan. 26, 1970
[21] Appl. No.: 5,595

[52] U.S. Cl..............................................331/94.5, 330/4.3
[51] Int. Cl..................................................H01s 3/06
[58] Field of Search..........................331/94.5; 330/4.3

[56] References Cited

UNITED STATES PATENTS 3,398,379   8/1968   Sims et al...........................331/94.5
3,215,949   11/1965   Garrett..................................331/94.5

Primary Examiner—William L. Sikes
Attorney—John F. Ahern, Paul A. Frank, Julius J. Zasalicky, Frank L. Neuhauser, Oscar B. Waddell and Joseph B. Forman

[57] ABSTRACT

A coolable slab laser is disclosed wherein the effects of thermal gradients within the laser element are minimized. The laser beam is made to traverse the longitudinal axis of the laser element a plurality of times in a zig-zag fashion so as to travel parallel to the thermal gradient as closely as possible. The laser element itself is an eight sided solid with beam entrance and exit areas on the same end of the element.

6 Claims, 3 Drawing Figures

Patented May 23, 1972                          3,665,335
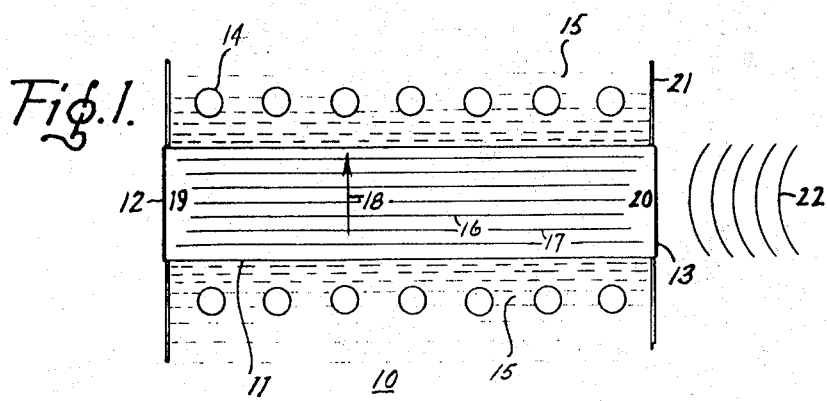
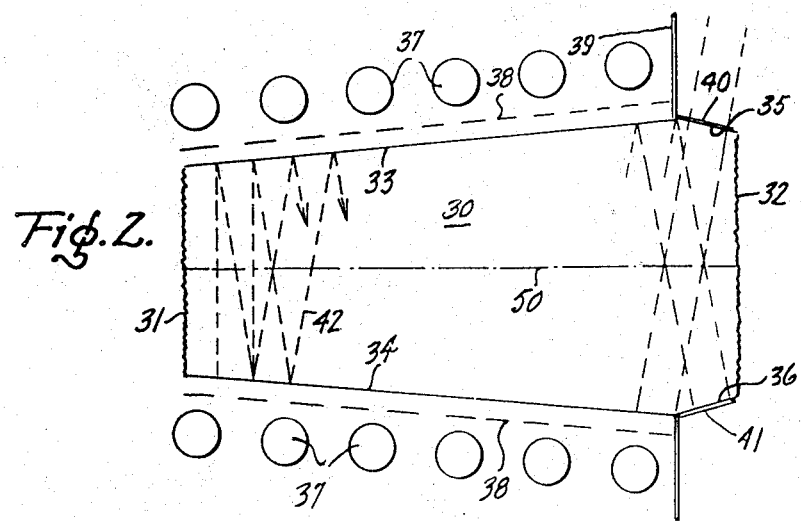
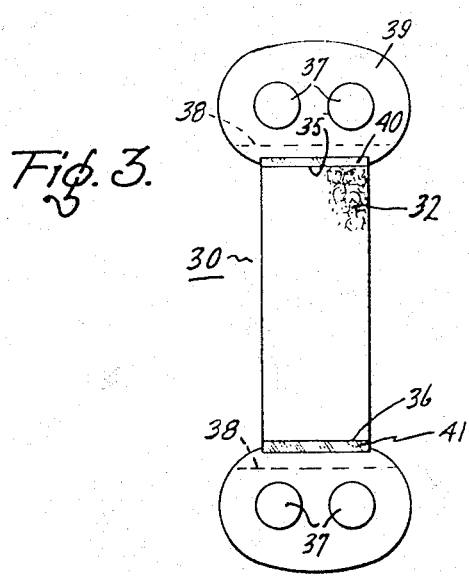
Inventor
Kiyo Tomiyasu
by Paul A. Frank
His Attorney

COOLABLE SLAB LASER

This invention relates to a coolable slab laser device wherein the effects of thermally induced distortions of the output beam are reduced by reflecting the beam within the laser material so as to average out distortions of the beam.

In a pulsed laser, as the pulse repetition rate increases, the average power dissipated by the laser increases even though the energy per pulse remains the same. A portion of the power dissipated by a laser is given off as heat, raising the temperature of the laser material. The use of an external cooling means, such as a fluid surrounding the laser element, reduces the average temperature of the laser material but induces a thermal gradient in the laser material, i.e., the temperature within the laser material is not uniform.

These non-uniformities within the laser material distort the beam in two ways. First, the variations in temperature cause stresses in the material by virtue of the contraction of cooler portions of the laser material. Second, the velocity of the beam through the material varies with the temperature, i.e., the beam travels faster through the cooler portions. The distortion thus produced is not unlike looking across an asphalt highway on a summer day. A series of equi-temperature, horizontal planes ascend from the highway. The temperature gradient is therefore vertical, perpendicular to the line of sight of the observer. In a similar manner, a laser beam is distorted by traveling perpendicularly to the thermal gradient in a laser material.

It is therefore an object of this invention to reduce thermal distortions of a laser beam by causing the beam to travel, as closely as possible, parallel to the temperature gradient.

A further object of the present invention is to generate a laser beam in a material by reflecting energy a plurality of times in a laser material parallel to the thermal gradient.

A further object of the present invention is to amplify a laser beam by having it reflected parallel to the thermal gradient in a laser material a plurality of times.

Another object of the invention is to provide a low thermal distortion slab laser wherein the reflecting sides, facing the pump lamps, are not parallel.

Yet a further object of the invention is to provide a wedge-shaped slab laser element having beam entrance and exit areas on the same end.

Another object of the invention is to provide a slab laser amplifier in which the amplified beam traverses the length of the laser element at least twice in a zig-zag pattern.

The foregoing objects are achieved by the present invention wherein there is provided a wedge-shaped, eight sided slab laser in which the generated beam is reflected between non-parallel, narrow walls a plurality of times at a small angle of incidence such that the generated beam travels nearly parallel to the thermal gradient within the laser material. Since the angle of incidence involved is less than that for total internal reflection, the narrow sides of the laser element are provided with a one hundred percent mirror coating. The reflecting, non-parallel sides are paired with shorter, non-parallel sides which provide entrance and exit areas for a beam when the laser element is used as an amplifier. When used as a beam generator, the laser element has its shorter, non-parallel sides coated, one with a partial mirror, one with a fully reflective mirror. The over-all shape of the slab may be considered wedge, keystone, or coffin-shaped.

The various features of the invention may best be understood by considering the following detailed description in conjunction with the attached drawing in which:

FIG. 1 illustrates a typical laser and the problem to which the present invention is directed.

FIG. 2 illustrates one form of coolable slab laser in accordance with the present invention.

FIG. 3 illustrates a modified form of the present location in which the pump lamps are relocated.

In FIG. 1 there is shown a conventional laser 10 comprising a block of laser material 11 which may be in slab or cylindrical form having at one end a one hundred percent reflecting mirror 12 and at the other end a partial mirror 13. Surrounding the laser material 11 are a plurality of pump lamps 14 which serve to invert the population within the laser material. Also surrounding the laser material 11 is a lower index of refraction cooling fluid 15 into which the heat generated by the laser may flow. Shown within the laser material 11 are a series of isothermal lines such as lines 16 and 17. These lines are caused by the fact that the cooling fluid 15 in contact with the surface of the laser material 11 induces a temperature change over the width of the laser material from the center to the outside. The temperature represented by line 16 would therefore be higher than the temperature represented by line 17 and so on. Spaces 19 and 20 shown at each end of the laser material represent that area in which the isothermal lines would bend due to cooling of the ends of the laser. This, however, can be minimized by containing the cooling fluid within a container 21 so that the cooling fluid only comes in contact with the laser about its longitudinal dimensions.

The temperature variations within the laser material 11 induce a temperature gradient 18 which is perpendicular to the isothermal lines 16 and 17. Light passing longitudinally through the laser material having a temperature gradient such as shown by line 18 will be distorted due to these temperature variations. The light will pass through the laser material faster in the cooler portions than in the hotter central portion. This effect produces a wave front that is not planar but rather curved as shown by curves 22. Curvature may be in opposite direction, i.e., convex outward, if the hotter central region results in longer length of rod at the center; this is called a thermal lens effect. It is the purpose of the present invention to overcome this distortion of the beam by providing a laser material of a unique shape and operating in a unique fashion.

One example of the laser constructed in accordance with the present invention is shown in FIG. 2 as element 30. The laser element 30 is shown as comprising a slab of laser material having a wedge or keystone shape and bounded at each end by non-specular end surfaces 31 and 32 spaced from each other along the longitudinal axis 50 of the laser material. The top and bottom surfaces of the laser material are not shown in FIG. 2 but comprise parallel planes perpendicular to the end surfaces 31 and 32 and parallel to the longitudinal axis 50. The sides of the laser element 30 are each made up of two surfaces 33, 35 and 34, 36. These two surfaces are angled relative to each other at an obtuse angle and by their relative positioning give the laser element its characteristic function as set forth below. Surrounding the laser material are a plurality of pump lamps 37 and filtering means 38. Also surrounding the laser material but not illustrated is the cooling means such as was shown in FIG. 1 as element 15. Containing the coolant and keeping it away from the end portions of the laser is an opaque reflecting shield 39. The parallel surfaces of the laser material, that is, the end and top and bottom surfaces are non-specular. The non-parallel side surfaces 33 and 34 have coatings with one hundred percent reflectance at the laser wavelength at normal incidence but substantially transparent for the pump radiation which is incident essentially from $2\pi$ steradians. The side surfaces 35 and 36 will have either a partial mirror coating 40 on surface 35 and a one hundred percent mirror coating 41 on the surface 36 or these surfaces will have an anti-reflection coating. When the surfaces 35 and 36 have a mirror coating, the surfaces 35 and 36 then form a Fabry-Perot cavity which will then enable the device to act as a laser beam generator. When the surfaces 35 and 36 have an anti-reflection coating, or are inclined at Brewster's angle, the device will then act as a laser beam amplifier with one of the surfaces 35 or 36 acting as an input or entrance area and the other of the surfaces 35 and 36 acting as an exit area. If inclination at Brewster's angle is utilized, the surfaces 35 and 36 need not be symmetrically oriented about longitudinal axis 50, since there are two orientations of each of surfaces 35 and 36 that will intercept beam path 42 at Brewster's angle.

The over-all operation of the laser 30 may best be understood by contrast with the operation of the laser 10 in FIG.

1. As shown in FIG. 1 the laser 10 produces a beam of light in which the wave fronts 22 are not planar. This is due to the fact that the light is passing perpendicular to the temperature gradient 18. However, in a laser device constructed in accordance with the present invention as shown in FIG. 2, the beam of light travels along a path such as shown by the dotted line 42 which path is as nearly as possible parallel to the temperature gradient within the laser material. Thus, when the laser material is acting as an amplifier, the beam may enter, for example, through surface 36 and be reflected between the surfaces 33 and 34 passing from one end 32 to the other end 31 and then back again and exiting through surface 35. By following a zig-zag path down the laser material, the beam of light travels through the different temperature ranges of the laser material in a direction which is very nearly parallel to the temperature gradient. The entire beam is affected in a like manner and thus the wave front of such a beam will lie in a plane. The beam path 42 has as small an angle of incidence as possible so that the beam travels as nearly as possible in a direction parallel to the temperature gradient. By so doing, the temperature induced distortions of the laser beam are greatly reduced.

In FIG. 3 there is shown an alternate embodiment of the present invention in which the pump lamps 37 are arranged parallel to the longitudinal axis of the slab so as to provide a more efficient radiation of the laser material.

The pump housing 39 contains the cooling fluid surrounding the pump lamps 37 and keeps the fluid in contact with the laser material 30. The filtering elements 38 perform the same function as those in FIG. 2, that is, to filter out the ineffective and detrimental ultraviolet and infrared radiation coming from the pump lamps 37. The pump lamps 37 may be any type of flash lamp emitting radiation at wavelength suitable for laser action, for example, xenon flash tubes. The specific laser material used may be any desired material exhibiting laser characteristics such as the neodymium doped glass. Obviously, it might be desirable to modify the wedge angle of the slab, the width, length, beam diameter, and the location of the opaque shield to further minimize the thermal effects on the laser beam in accordance with the particular choice of materials and use of the laser.

What I claim as new and desire to secure by Letters Patent of the United States is:

1. A laser element comprising
   a slab of laser material in the form of an eight sided solid having a longitudinal axis and bounded by
   two spaced parallel nonspecular planes perpendicular to the longitudinal axis and forming first and second end surfaces of the laser element,
   two spaced parallel nonspecular planes parallel to the longitudinal axis and forming top and bottom surfaces of the laser element,
   first two nonparallel planes perpendicular to said top and bottom surfaces and intersecting, if extended, along a first line parallel to said first end surface and spaced a particular first distance from the first end surface in a direction away from the laser element, said first two nonparallel planes having coatings with a one hundred percent reflectance at the laser radiation wavelength for radiation incident substantially at normal angle,
   second two nonparallel planes shorter in length than said first two nonparallel planes and perpendicular to said top and bottom surfaces and intersecting, if extended, along a second line parallel to the second end surface and spaced a particular second distance, less than the particular first distance, from the second end surface in a direction away from the laser element, the first and second lines intersecting the longitudinal axis, one of said second two nonparallel planes having a one hundred percent mirror coating, the other of said second two nonparallel planes having a partial mirror coating,
   one of said first and second two nonparallel planes intersecting at a first obtuse angle and forming a first side surface of the laser element, and
   the other of said first and second two nonparallel planes intersecting at a second obtuse angle and forming a second side surface of the laser element, a beam of laser radiation which is produced in the laser element in response to optical pumping of the laser material being reflected between said first two nonparallel planes a plurality of times at a small angle of incidence less than that for total internal reflection in passing from the second end to the first end and back again to the second end of the laser element.

2. A laser element as set forth in claim 1 wherein said second two nonparallel planes have an anti-reflecting coating instead of one having a one hundred percent mirror and the other a partial mirror coating.

3. A coolable slab laser comprising
   a slab of laser material in the form of an eight-sided solid having a constant height rectangular cross section perpendicular to its longitudinal axis and two parallel end surfaces perpendicular to said longitudinal axis which define the longitudinal dimension of said slab,
   said rectangular cross section of constant height but increasing in width from one end surface of the slab to an intermediate point along said longitudinal axis and then decreasing in width continuing from said intermediate point to the other of said end surfaces,
   said increasing width portion defined by a first pair of side surfaces, said decreasing width portion defined by a second pair of side surfaces, said first and second pair of side surfaces intersecting at said intermediate point, the height of said rectangular cross section defined by parallel top and bottom surfaces,
   said parallel end and top and bottom surfaces having a nonspecular finish,
   said first pair of side surfaces having a substantially one hundred percent mirror coating at laser wavelength adapted to reflect a beam of laser wavelength energy within the laser material but being transparent at pumping radiation wavelengths,
   optical pump means located adjacent said first pair of side surfaces for impinging pumping radiation only thereon and inducing a population inversion in a particular excited energy level characteristic of the laser material and thereby producing a laser wavelength energy beam therein which is reflected between said first pair of side surfaces a plurality of times at a small angle of incidence less than that for total internal reflection while traveling longitudinally from a first of said end surfaces to a second of end surfaces and back again to said first end surface, and
   cooling means in contact with said first pair of side surfaces for withdrawing heat from said laser material during operation of said laser and inducing a thermal gradient in the laser material, the reflected laser wavelength energy beam traversing paths nearly parallel to the thermal gradient due to the reflection at small angle of incidence to thereby substantially reduce temperature induced distortions in the laser beam wavefront.

4. A coolable slab laser as set forth in claim 3 wherein said second pair of side surfaces having an anti-reflection coating, whereby said laser acts as an amplifier in which a beam of laser wavelength energy enters through one of said second pair of side surfaces, is reflected between said first pair of side surfaces, accumulating energy from the pumped laser material, and exits through the other of said second pair of side surfaces.

5. A coolable slab laser as set forth in claim 3 wherein one of said second pair of side surfaces has a substantially one hundred percent mirror coating and the other of said second pair of side surfaces has a partial mirror coating to form a Fabry-Perot laser cavity having a folded beam path, said folded beam path being contained by said first pair of side surfaces.

6. A coolable slab laser as set forth in claim 5 wherein the distance along said longitudinal axis from said one end surface to the intermediate point is greater than the distance along said longitudinal axis from said intermediate point to the other of said end surfaces.

* * * * *